UNITED STATES PATENT OFFICE.

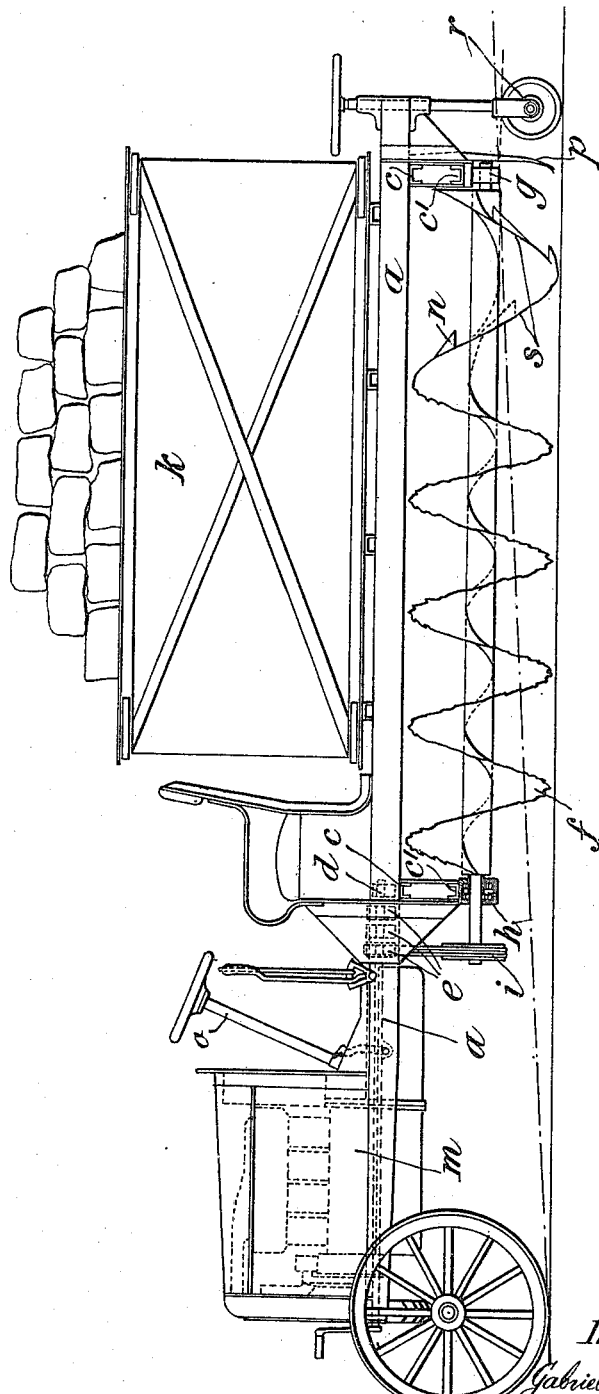

GABRIEL ANTOINE VEYRE, OF CASABLANCA, MOROCCO.

MOTOR-PLOW.

1,282,991.  Specification of Letters Patent.  Patented Oct. 29, 1918.

Application filed October 12, 1917. Serial No. 196,325.

*To all whom it may concern:*

Be it known that I, GABRIEL ANTOINE VEYRE, a citizen of the Republic of France, residing at Casablanca, Morocco, have invented a new and useful Motor-Plow, of which the following is a specification.

The object of my invention is to simplify the tilling of land and to dispense with the heavy tractors usually employed for drawing the plow-shares or disks designed to turn over the soil, and which have the two following objections:

1. The tractor, which is necessarily heavy and provided with driving wheels having very wide rims to afford sufficient bearing surface upon the ground, has precisely the effect of a roller compressing the soil in advance of the shares or disks, that is to say, at the very moment when it is necessary to dig up and turn over the soil.

2. The tearing up of the soil by the shares or disks requires very great power which is so much the greater as the entangled roots of the plants form a more compact net work.

The invention relates to plows of that type having Archimedean screws for cutting the soil and the roots of plants after the manner of a circular saw in order to obtain to the required depth, a cut out clod of earth which can then be easily moved and turned over without tearing it.

By virtue of their rotary movement the turns of these screws are caused by the weight of the machine itself progressively to enter the soil and cut it vertically. To cut the soil horizontally several triangular teeth are provided on the periphery of the last turn, the plane of which teeth is parallel with the axis of the screw. This last turn has a pitch double that of the other turns of the screw in order to press back, while cutting it horizontally, the clod already vertically cut by the preceding turns.

The apparatus will be fully understood with reference to the accompanying drawing which is a side elevation of the same.

It consists of an ordinary chassis $a$ of a motor carriage from which the driving shaft, the driving axle, the rear wheels and the rear springs have been removed.

The change-speed Cardan head of this chassis is prolonged by a driving shaft $b$ fixed to the chassis by means of a cross piece $c$ and bearing $d$. On this shaft are fixed toothed wheels $e$ for control from the chassis.

Underneath and at the rear of the chassis are fixed one or more Archimedean screws $f$ (for the sake of simplicity only one is shown) revolving in two bearings $g$ and $h$, the forward bearing $h$, represented in section, being a thrust-block ball bearing, and the two bearings being carried by the cross pieces $c$ $c^1$, bolted to the chassis and forming one with it.

The shaft of the screw $f$ carries at the front a sprocket wheel $i$ driven through the medium of a chain by the wheel $e$ of the driving shaft $b$.

The entire weight of the back of the chassis, therefore, bears upon the ground through the convolutions or turns of the screw $f$ which are all of the same diameter.

Upon the chassis is fixed a wooden case $k$ to allow of loading the apparatus with earth or stones to increase the weight of the chassis and thus compel the turns of the screw $f$, while rotating, to enter the soil to the desired depth.

The rotation of the motor $m$ gives motion to the screw $f$ and, by reason of the weight of the apparatus, the convolutions or turns cut up the soil by slightly sinking therein and, as the entire peripheral development of the screw will pass through the furrow of the first turn, the entrance into the soil will be progressive, each turn adding its work in depth to the depth of the preceding turn. The last turn will therefore sink deeper into the ground than the first turn and the screw will automatically assume an inclination toward the rear corresponding to the penetration resistance of each turn. It will be understood that at the same time that the turns of the screw $f$, furrow the soil, the whole of the apparatus moves forward and that the steering is effected by the front wheels which, owing to the front spring will maintain contact with the ground notwithstanding the inclination of the chassis and screw just referred to.

In order to turn over the soil thus cut by the turns of the screw $f$ it is pressed back by giving the last turns a double pitch, the effect of which will be to push back the soil since this convolution or turn has only one clod to press back, while the screw bears upon all the other clods comprised between the preceding turns.

To facilitate the pressing back of this last clod, which is only cut vertically, the last turn has small triangular teeth $n$ distributed over its periphery toward the rear and in a plane parallel to the axis of the screw *f*. The number of these teeth depends on the extent of their projection from the turn *s* and on the pitch of the preceding turns.

If, for example, this pitch is 30 centimeters, there may be six teeth of 5 centimeters each. At each revolution of the screw the last or double pitch turn will push back the soil for the length of the pitch of the preceding turns (30 centimeters) and each of the six teeth *n* will score the soil horizontally before pressing it back and as fast as the pressing back is effected, so that by this progressive cutting up the soil, instead of being simply pressed back in a single clod of 30 centimeters to the rear, will be subjected, after each passage of a tooth, to a compression between the convolution and the rest of the clod not yet cut by the teeth, and this partial pressing back will break it up while turning it over. To complete this turning over, if required it is only necessary to slightly incline the end of the convolution.

The number of Archimedean screws *f*, the number of turns of each screw and the length of pitch of the said screws will, for each apparatus, be suitable to the power of the motor, and the nature of the soil.

To allow the guide wheels controlled by the steering wheel *o* always to travel over firm ground when the apparatus is running along a part of the land which is already plowed, all the screws are moved laterally, so that one of the screws plows the ground outwardly with relation to the passage of the wheel, the side which is moved running along the part already plowed as is likewise done with the shares of ordinary motor plows.

Between the segments of the soil thus plowed by the screws, there will be projecting portions of the soil not turned up. These projecting portions will be turned over by the arrow shaped harrow-teeth *p* fixed to the back of the chassis, and corresponding to the interval between each screw and, as regards length, to the depth of the furrows of the last turn.

A wheel *r*, the height of the axis of which can be regulated as required, by means of a screw *v* engaging a threaded socket *t* fixed to the chassis, allows the apparatus to be hauled over roads, for example, by putting the screw *f* out of action, the said wheel *r* being capable, if required, of receiving movement from the motor by a suitable arrangement which will do away with hauling, the apparatus being thus moved over roads by its own means.

I claim:

1. In a motor plow of the type comprising a chassis carrying a motor driving a longitudinal screw, the convolutions of which serve to propel the chassis, a screw having a plurality of convolutions for cutting into the soil and having a supplemental portion of increasing pitch for insuring the turning over and mixing of the soil.

2. In a motor plow according to claim 1, the screw having its convolutions formed with peripheral teeth for cutting into the soil.

3. In a motor plow according to claim 2, the screw having peripheral teeth projecting rearwardly from its blades.

4. In a motor plow of the type comprising a chassis carrying a motor driving a longitudinal screw, the convolutions of which serve to cut the soil and propel the chassis, a screw having a plurality of convolutions of equal pitch to cut the soil and insure the propulsion of the chassis, and supplementary portion of higher pitch for turning over and mixing the soil.

5. In a motor plow according to claim 4, the screw having its convolutions of increased pitch fitted peripherally with projecting teeth.

6. In a motor plow according to claim 4, the screw having its convolutions of equal pitch formed with peripheral teeth for cutting into the soil, and having projecting teeth on the portion of higher pitch, such teeth projecting rearwardly from the periphery of the screw.

In witness whereof I have hereunto signed my name in the presence of two subscribing witnesses.

GABRIEL ANTOINE VEYRE.

Witnesses:
 PAUL MAIN,
 R. AVERY.

Copies of this patent may be obtained for five cents each, by addressing the "Commissioner of Patents, Washington, D. C."